(12) United States Patent
Franz et al.

(10) Patent No.: US 7,885,389 B2
(45) Date of Patent: Feb. 8, 2011

(54) METHOD FOR CONTROLLING ANNOUNCEMENTS AND INTERACTIVE RESPONSES IN AN EXCHANGE

(75) Inventors: Mathias Franz, Berlin (DE); Alfred Jugel, Geretsried (DE); Patrick Kleiner, München (DE); Norbert Löbig, Darmstadt (DE); Klaus Pulverer, München (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 901 days.

(21) Appl. No.: 10/416,305

(22) PCT Filed: Nov. 6, 2001

(86) PCT No.: PCT/DE01/04162

§ 371 (c)(1),
(2), (4) Date: Oct. 31, 2003

(87) PCT Pub. No.: WO02/39706

PCT Pub. Date: May 16, 2002

(65) Prior Publication Data

US 2004/0071274 A1    Apr. 15, 2004

(30) Foreign Application Priority Data

Nov. 10, 2000    (DE) ................. 100 55 642

(51) Int. Cl.
*H04M 1/64* (2006.01)
*H04M 11/00* (2006.01)

(52) U.S. Cl. .................. 379/76; 379/88.18; 379/88.22

(58) Field of Classification Search .................. 370/352
See application file for complete search history.

(56) References Cited

U.S. PATENT DOCUMENTS

| | | | |
|---|---|---|---|
| 5,113,430 A | | 5/1992 | Richardson, Jr. et al. |
| 5,329,579 A | * | 7/1994 | Brunson .................. 379/88.26 |
| 5,781,854 A | * | 7/1998 | Bales .......................... 455/403 |
| 6,104,803 A | * | 8/2000 | Weser et al. ................ 379/230 |
| 6,181,707 B1 | * | 1/2001 | Erickson et al. ............. 370/442 |

(Continued)

FOREIGN PATENT DOCUMENTS

DE    198 18 006 A1    10/1999

(Continued)

*Primary Examiner*—Joseph T Phan
(74) *Attorney, Agent, or Firm*—Laurence A Greenberg; Werner H. Stemer; Ralph E. Locher

(57) ABSTRACT

The provision of subscriber service features is one of the tasks of exchanges in classic TDM networks. This includes e.g., announcements and interactive responses. According to the prior art, these announcements and interactive responses are either provided by peripheral devices of the exchange which are equipped with the appropriate function or by external announcement and interactive response systems. The latter are provided either in TDM networks with proprietary interfaces or in packet networks with standardized interfaces. The invention solves the problem of providing the service for classic TDM networks by providing that the known packet-based method for controlling an external system for providing announcements and interactive responses is transferred to an exchange located in the classical TDM network. In particular, this enables the protocol used to control the external announcement and interactive response system, which was originally standardized as a signalling protocol for controlling a media gateway, to be used.

5 Claims, 1 Drawing Sheet

U.S. PATENT DOCUMENTS

| | | | |
|---|---|---|---|
| 6,498,791 B2 * | 12/2002 | Pickett et al. | 370/353 |
| 6,519,232 B1 * | 2/2003 | Becher | 370/314 |
| 6,763,017 B1 * | 7/2004 | Buckingham et al. | 370/352 |
| 7,068,594 B1 * | 6/2006 | Tasker | 370/217 |

FOREIGN PATENT DOCUMENTS

| | | |
|---|---|---|
| DE | 198 50 641 A1 | 5/2000 |
| DE | 692 30 905 T2 | 8/2000 |
| DE | 100 47 129.3 | 4/2002 |
| EP | 0 637 160 A2 | 2/1995 |
| EP | 0 964 566 A2 | 12/1999 |
| EP | 1 054 569 A1 | 11/2000 |
| GB | 2 325 112 A | 11/1998 |
| JP | 11-275070 | 10/1999 |

* cited by examiner

METHOD FOR CONTROLLING ANNOUNCEMENTS AND INTERACTIVE RESPONSES IN AN EXCHANGE

CLAIM FOR PRIORITY

This application is a national stage of PCT/DE01/04162 published May 16, 2002, which claims priority to German application 10055642.6 filed Nov. 10, 2000.

TECHNICAL FIELD OF THE INVENTION

The invention relates to a method for controlling announcements and interactive responses in a TDM-based exchange having peripheral devices

BACKGROUND OF THE INVENTION

The provision of subscriber service features or network service features is one of the tasks of exchanges in conventional TDM networks. This includes, for example, announcements and interactive responses which in certain situations are delivered to the A and/or B subscriber (e.g. "number unobtainable," "the number has changed—the new number is 722-25940" or interactive responses prompting for subscriber data for the use of IN services).

These announcements and interactive responses can be provided either by peripheral devices of the exchange that are equipped with the appropriate functionality or by an external announcement and interactive response system (referred to in the following as an "IVR system" or "interactive voice response system").

Announcements and interactive responses are necessary to the extent that a large number of operations in the exchange are controlled by operator prompts. Thus, for example, switching-oriented events such as, e.g. dialing an unobtainable number or calls with delay systems require announcements for the calling subscriber. Furthermore, services comprising interactive responses such as, e.g. interactive support for controlling independent subscriber inputs, must be implemented in the exchange. Finally, SCP-controlled IN services featuring user interactive responses should be present, these responses being controlled via the interface between SCP and exchange with SSP functionality.

A feature common to all these cases is that the control logic for the announcement and interactive response function is provided in the exchange itself or in the components (SCP) connected to the exchanges. This also applies in the case of the external announcement and interactive voice response system IVR referred to. For this reason, a control interface is required for controlling the announcements and interactive responses including variable announcement parameters, as well as for feeding back collected user inputs between exchange and external announcement and interactive voice response system IVR.

Currently, two solutions exist in the state of the art.

In the first solution approach, the announcements and interactive responses are provided in peripheral devices of an exchange. For this purpose, peripheral devices of the exchange having hardware modules for providing announcements and DTMF/voice recognition are introduced into the exchange. In order to play back an announcement or interactive response, the subscriber/trunk is switched to a port of this special peripheral device for announcements and interactive responses via a 64 kbps through-connection. From a switching-oriented viewpoint, this is a through-connection of a call routed from an A-side peripheral device via the switching network to the B-side peripheral device with announcement and interactive response functionality. The B-side announcement/interactive response port acts as a B-side trunk. The type of announcement/interactive response function to be played back is effected by exchange-internal signaling to the peripheral device with announcement and interactive response functionality or is permanently predefined.

The advantage of this integration solution lies in cost-effective provision of the announcement and interactive response function as well as in broad access to the hardware functionality of the peripheral device for announcement and interactive response functionality. A disadvantage, on the other hand, is the circumstance of a proprietary hardware, as a result of which use of the wide range of host-based voice recognition and voice synthesis algorithms is severely restricted without porting overhead. In addition, in an integration solution of this type, the announcement and interactive response system in question cannot be used as a central resource in the network.

In the second solution approach, the announcements and interactive responses are provided by external systems. For this purpose, there exist a number of solutions enabling the exchange to control the announcements and interactive responses in an external system (IVR). The proprietary application protocols (operations and parameters) are implemented on the basis of TDM signaling protocols (ISDN-PA or ISUP).

Although, in this case, in contrast to the integration solution, the announcement and interactive response system in question can be made usable as a central resource in the network, it is disadvantageous that the control interface cannot be used in the packet network.

A solution approach of this type has already been proposed in the German patent application DE 10047129.3. In that case, however, the controller is implemented exclusively for packet networks. Conventional TDM networks are not referred to in that description.

SUMMARY OF THE INVENTION

An object of the invention is to disclose a way in which announcement and interactive response systems can be integrated into a TDM communications network by simple elements.

According to an aspect of the invention, the known packet-based method for controlling an external system for providing announcements and interactive responses is transferred to an exchange disposed in the conventional TDM network. In this way, in particular, the protocol used to control the external announcement and interactive response system, which was originally standardized as a signaling protocol for controlling a network transition point (media gateway), can be used. From the viewpoint of the exchange, the external announcement and interactive voice response system IVR is thus represented as a network transition point. This network transition point is represented by the media gateway, which converts packet-based voice information into TDM voice information.

The peripheral device with virtual announcement and/or interactive response ports described in the prior art referred to can therefore continue to be used. Similarly, a connection separate from the signaling path and serving to transfer the TDM user data stream between exchange and external announcement and interactive response system is advantageously implemented. In this respect, there thus takes place a consideration of the external announcement and interactive response system as a combination of an external announcement and interactive response system in the packet network with direct packet-based interface for the announcements and end user inputs, and a media gateway for converting the packet-based user data into a TDM data stream.

DETAILED DESCRIPTION OF THE INVENTION

Figure 1:
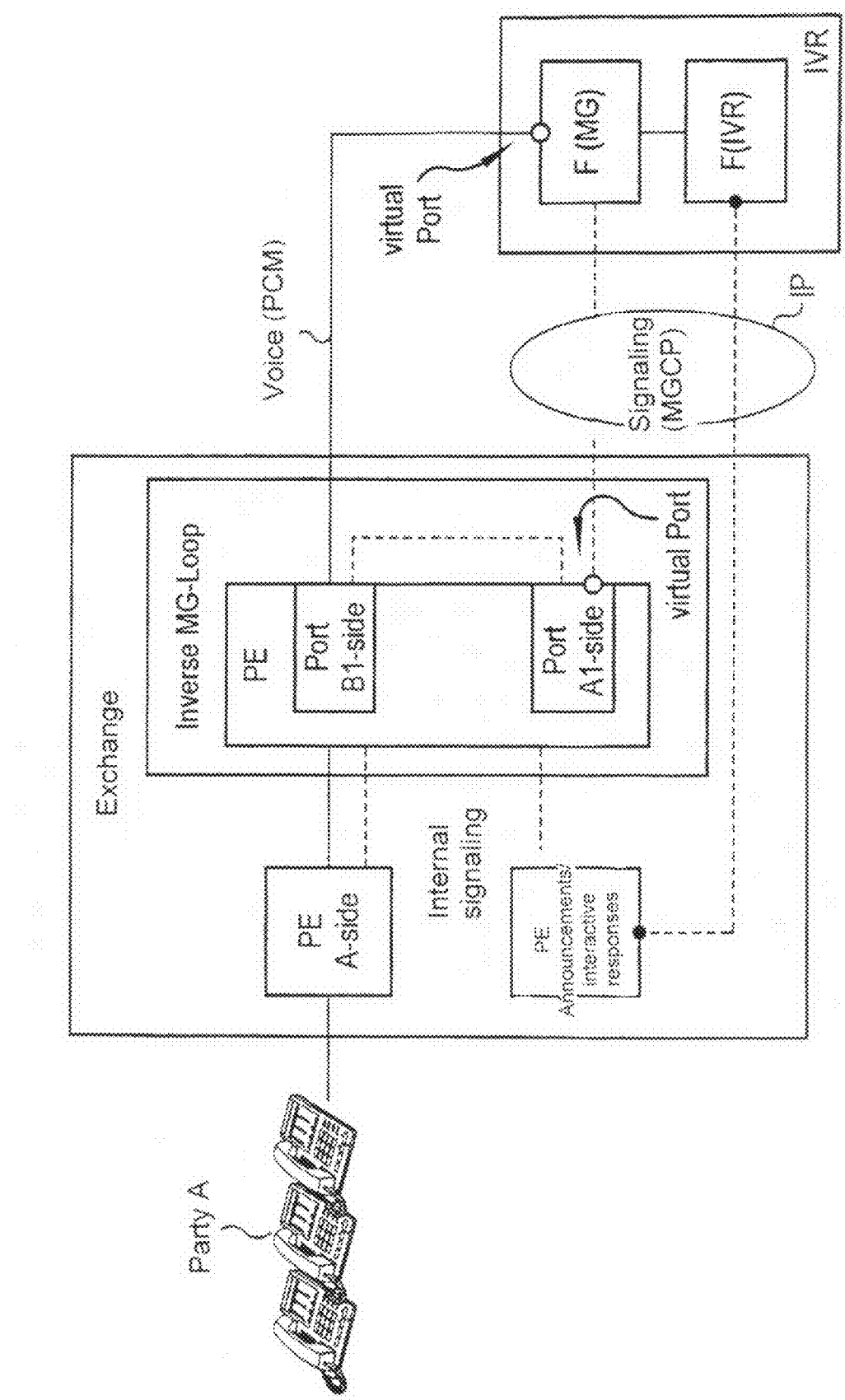
FIG. 1 shows an exchange V according to the invention.

FIG. 1 shows an exchange V, which is actively connected to an external announcement and interactive voice response system IVR. The external announcement and interactive voice response system IVR exists on one hand of a hardware platform on which the functionality is executed. According to the invention, the functionality is modeled as a combination of two function complexes.

The 1st function complex includes the external announcement and interactive voice response system F(IVR) in the packet network with an internal packet-based interface to a 2nd function complex for user data containing the announcements and end user inputs.

The signaling protocol MGCP used for controlling the media gateway MG via IP is used for controlling the external announcement and interactive voice response system IVR by the exchange V. The announcement/interactive response functionality is controlled by introducing additional parameters in this protocol which describe the execution of the announcement and interactive response function. IVR parameters of this type are in particular the number or name of an announcement or interactive response, the number of retries, actions in the event of a fault or absence of an input by the end user, as well as individual parameters where appropriate, such as a changed subscriber number. Examples of useful parameters can be found in the INAP, MGCP and H.248 standardization.

The 2nd function complex includes the media gateway F(MG), which converts the packet-based interface for the user data containing the announcements and end user inputs of the external announcement and interactive voice response system IVR into a TDM data stream. This is transported bi-directionally between exchange V and media gateway MG via PCM trunks. The media gateway F(MG) is also controlled by the exchange V via the signaling protocol MGCP used for controlling a media gateway via IP.

In the combination of the two function complexes F(IVR) and F(MG) on the hardware platform for the external announcement and interactive voice response system IVR, the following interfaces are thus produced externally:

PCM trunks for the TDM user data stream
packet-based signaling interface for controlling media gateway F(MG) and external announcement and interactive voice response system F(IVR).

The external announcement and interactive voice response system IVR is controlled by the peripheral device with virtual announcement and/or interactive response ports described in German patent application DE 10047129.3. This peripheral device with virtual announcement and/or interactive response ports converts the B-side seizures of its ports by the exchange into a seizure signaling scheme of the media gateway with IVR functionality assigned to the port. The requests for playing announcements and interactive responses are brought out by this peripheral device in the direction of the media gateway with IVR functionality. Feedback messages of the external announcement and interactive voice response system IVR which indicate the end of the announcement or contain the input by the end user are returned to the assigned peripheral device with virtual announcement and/or interactive response port. All signaling between the peripheral device serving the virtual announcement and/or interactive response port and the assigned external IVR system is effected via the signaling protocol MGCP, which is used to access a media gateway.

In contrast to the arrangement of the external announcement and interactive response system in the packet network, in which the external announcement and interactive response system sends its user data stream outside of the exchange into the packet network, with the method presented here, two further interfaces must be controlled by the exchange, namely the interface to the PCM trunks for TDM user data stream and the packet-based signaling interface for controlling the media gateway in the external announcement and interactive voice response system IVR.

In order to control the media gateway in the external announcement and interactive voice response system IVR and to switch through the PCM trunks in the exchange, a further peripheral device is looped into the connection in addition to the peripheral device PE involved in the connection setup and clear-down for terminating the A-side subscribers or trunks, and to the peripheral device PE with virtual announcement and/or interactive response ports. This looped-in peripheral device, referred to below as an inverse MG loop, contains outgoing and incoming ISUP ports.

The PCM trunks to the media gateway of the external announcement and interactive voice response system IVR are connected to the voice channels of the outgoing ISUP ports. The incoming ISUP ports are virtual ports, since they do not terminate any physical trunks. A PCM channel of the media gateway in the external announcement and interactive voice response system IVR is assigned to each of these virtual ports.

The virtual ports control the ports of the media gateway in the external announcement and interactive voice response system IVR via the packet-based signaling protocol that is used for accessing a media gateway MG. A connection to the peripheral device with virtual announcement and/or interactive response ports is set up from the incoming ISUP ports via the switching network. The signaling path within the inverse MG loop and from this to the peripheral device with virtual announcement and/or interactive response ports must be widened in order to transfer the parameters sent by the central processor or the A-side peripheral device for the purpose of announcement and interactive response control.

When a service feature or a service in the exchange requires an announcement or an interactive response to be played, a suitable B-side virtual announcement and/or interactive response port is selected. These ports are set up in the familiar manner, although administratively a form of identification is required in order to indicate the virtual nature of the resource, i.e. the fact that the port resides in a device outside the exchange and is controlled by the exchange. The arrangement whereby a connection request originating from a real port exists to a port identified as virtual serves as an indicator for looping in the inverse MG loop.

Via the inverse MG loop, a PCM trunk to the media gateway in the external announcement and interactive voice response system IVR is then seized on the one hand, and on the other hand a virtual port for controlling the media gateway in the external announcement and interactive voice response system IVR is seized. Additionally initiated at this time is the seizure of the virtual announcement and/or interactive response port and the transfer of the request signaling describing the desired IVR function to the associated peripheral device for switching-oriented processing of the announcement and/or interactive response port.

Thus, the reusability of the services with IVR components implemented in the conventional exchange is enabled, since these services do not have to be modified because they find the peripheral device with IVR function with which they are familiar in the peripheral device referred to. The fact that the IVR function is ultimately provided by an external system remains hidden from these software functions.

The invention claimed is:

1. A method for controlling announcements and interactive responses in a TDM-based exchange having peripheral devices, comprising:
   providing the peripheral devices with at least one of virtual announcement ports and interactive response ports, the virtual ports not terminating any trunk or subscriber line and not having any hardware for trunk or line termination;
   modeling at least one function complex on an external hardware platform, wherein the external hardware platform receives announcement and interactive response functionality;
   controlling the external hardware platform via a packet-based control interface, which exists between the peripheral devices and the external hardware platform, by at least one of the peripheral devices with virtual announcement and interactive response ports; and
   looping into a setup of a connection another interface via which a TDM data stream carrying the announcements and interactive responses is transferred,
   wherein the TDM data stream carrying the announcements and interactive responses is transferred between the external hardware platform and the TDM-based exchange.

2. The method according to claim 1, wherein the at least one function complex is implemented as at least one of an external announcement and interactive voice response system and as a media gateway between packet-based and TDM-based networks.

3. The method according to claim 1, wherein the packet-based control interface supports a MGCP or H.248 protocol.

4. The method according to claim 1, wherein the another interface is implemented as a PCM interface to a further peripheral device.

5. The method according to claim 1, wherein the external hardware platform is controlled like a packet-based IVR system and a separate media gateway between packet network and TDM networks.

* * * * *